United States Patent
Han et al.

(10) Patent No.: US 12,332,764 B2
(45) Date of Patent: Jun. 17, 2025

(54) ANOMALY DETECTION FOR TIME SERIES DATA

(71) Applicant: International Business Machines Corporation, Armonk, NY (US)

(72) Inventors: Si Er Han, Xi'an (CN); Jing Xu, Xi'an (CN); Xue Ying Zhang, Xi'an (CN); Xiao Ming Ma, Xi'an (CN); Jun Wang, Xi'an (CN); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/489,894

(22) Filed: Oct. 19, 2023

(65) Prior Publication Data
US 2025/0130919 A1    Apr. 24, 2025

(51) Int. Cl.
*G06F 11/34*    (2006.01)
(52) U.S. Cl.
CPC ................................ *G06F 11/3495* (2013.01)
(58) Field of Classification Search
CPC .................................................. G06F 11/3495
USPC ......................................................... 707/690
See application file for complete search history.

(56) References Cited

U.S. PATENT DOCUMENTS

| | | | | |
|---|---|---|---|---|
| 7,310,590 | B1 * | 12/2007 | Bansal | G06F 11/0751 703/22 |
| 7,346,471 | B2 * | 3/2008 | Chickering | G06Q 10/04 702/182 |
| 11,789,915 | B2 * | 10/2023 | Gonzalez Macias | G06F 16/211 707/690 |
| 12,261,866 | B1 * | 3/2025 | Yen | H04L 67/306 |

(Continued)

FOREIGN PATENT DOCUMENTS

| CN | 114595124 B | 7/2022 |
|---|---|---|
| JP | 3567073 B2 * | 9/2004 |

(Continued)

OTHER PUBLICATIONS

Wu et al., "Developing an Unsupervised Real-Time Anomaly Detection Scheme for Time Series With Multi-Seasonality", IEEE Transactions on Knowledge and Data Engineering, vol. 34, No. 9, Sep. 2022, pp. 4147-4160. (Year: 2022).*

(Continued)

*Primary Examiner* — Phuong Thao Cao
(74) *Attorney, Agent, or Firm* — Cantor Colburn LLP; Robert D. Bean (57) ABSTRACT

A computer-implemented method for anomaly detection for a time series data is provided. Aspects include receiving a time series data including a plurality of sequential data points, calculating an expected next value for the time series data based on the plurality of sequential data points, and receiving an actual next value corresponding to the time (Continued)

series data. Aspects also include calculating an anomaly strength estimate based on the expected next value and the actual next value, identifying one of a plurality of anomaly detection pipelines based on the anomaly strength estimate and a portrait associated with each of the plurality of anomaly detection pipelines, and obtaining an anomaly prediction by inputting the time series data and the actual next value into the one of the plurality of anomaly detection pipelines.

13 Claims, 7 Drawing Sheets

(56) References Cited

U.S. PATENT DOCUMENTS

| | | | | |
|---|---|---|---|---|
| 2010/0058345 | A1* | 3/2010 | Seidman | G06F 11/3466 |
| | | | | 718/101 |
| 2015/0269050 | A1* | 9/2015 | Filimonov | G06Q 10/0639 |
| | | | | 702/183 |
| 2019/0147300 | A1* | 5/2019 | Bathen | G06N 3/088 |
| | | | | 706/12 |
| 2019/0228296 | A1* | 7/2019 | Gefen | G06N 7/01 |
| 2021/0037037 | A1 | 2/2021 | Oliner et al. | |
| 2021/0397938 | A1* | 12/2021 | Tora | G06F 16/904 |
| 2022/0051049 | A1 | 2/2022 | Wang et al. | |
| 2022/0172038 | A1 | 6/2022 | Chen et al. | |
| 2022/0198222 | A1 | 6/2022 | Rawat et al. | |
| 2022/0237102 | A1* | 7/2022 | Bugdayci | G06F 11/327 |
| 2022/0382857 | A1* | 12/2022 | Liu | G06F 21/552 |
| 2023/0237044 | A1* | 7/2023 | Parthasarathy | G06N 20/00 |
| | | | | 707/690 |
| 2023/0289452 | A1* | 9/2023 | Jang | G06F 18/23 |
| 2023/0409703 | A1* | 12/2023 | Huang | G06F 21/566 |
| 2024/0112016 | A1* | 4/2024 | Toroman | G06N 3/0455 |
| 2024/0152132 | A1* | 5/2024 | Paul | G05B 23/024 |
| 2024/0281359 | A1* | 8/2024 | White | G06F 11/3409 |
| 2024/0323095 | A1* | 9/2024 | Beer | G06F 11/0709 |
| 2024/0334380 | A1* | 10/2024 | Ranco | G08G 1/20 |
| 2024/0411936 | A1* | 12/2024 | Tehranipoor | G06F 21/76 |

FOREIGN PATENT DOCUMENTS

| | | | | |
|---|---|---|---|---|
| KR | 20230003303 A | * | 1/2023 | |
| WO | WO-2018052015 A1 | * | 3/2018 | G05B 23/02 |
| WO | WO-2023213417 A1 | * | 11/2023 | G01N 27/333 |
| WO | WO-2024157352 A1 | * | 8/2024 | |

OTHER PUBLICATIONS

Goetz et al., "Decentralized Real-Time Anomaly Detection in Cyber-Physical Production Systems under Industry Constraints", Sensors 2023, 23, 4207: pp. 1-19, published Apr. 23, 2023. (Year: 2023).*

Abdallah et al., "AutoForecast: Automatic Time-Series Forecasting Model Selection," CIKM '22, Association for Computing Machinery, Oct. 17-21, 2022, 10 pages.

Lee et al., "A new visualization method for pairwise time-series data with random walk plot," Proceedings of the 9th International Conference on Ubiquitous Information Management and Communication, Jan. 2015, No. 64. 8 Pages.

* cited by examiner

ANOMALY DETECTION FOR TIME SERIES DATA

BACKGROUND

The present invention generally relates to anomaly detection, and more specifically, to anomaly detection for time series data.

Internet-of-things devices, sensors, or other machines often produce sequence or time series data. This time series data is then analyzed to identify anomalous data that can be used to infer information about the systems being monitored. Recently, machine learning models have been used to analyze time series data and to detect anomalous data. For example, a semi-supervised anomaly detection has been used, that builds a model on normal data to find out normal patterns, when a new data point is received, it is compared with the normal data pattern to determine whether the data point is abnormal.

Currently, in the model-building phase, several different models are built on normal data and the models are evaluated on a data set that includes abnormal points. Typically, the model that successfully identifies the most abnormal points (anomalies) is selected and deployed to monitor the time series data. However, in practice, the abnormal points in the evaluation data often do not include a broad enough spectrum of anomalies. As a result, the best model in the evaluation phase may not behave the best for anomalies in the prediction phases.

SUMMARY

Embodiments of the present invention are directed to a computer-implemented method for performing anomaly detection for time series data. The computer-implemented method includes receiving a time series data including a plurality of sequential data points, calculating an expected next value for the time series data based on the plurality of sequential data points, and receiving an actual next value corresponding to the time series data. The method also includes calculating an anomaly strength estimate based on the expected next value and the actual next value, identifying one of a plurality of anomaly detection pipelines based on the anomaly strength estimate and a portrait associated with each of the plurality of anomaly detection pipelines, and obtaining an anomaly prediction by inputting the time series data and the actual next value into the one of the plurality of anomaly detection pipelines.

Embodiments of the present invention are directed to a computer program product for performing anomaly detection for time series data. The computer program product includes one or more computer readable storage media having computer readable program code collectively stored on the one or more computer readable storage media. The computer readable program code is executed by a processor of a computer system to cause the computer system to perform operations. The operations include receiving a time series data including a plurality of sequential data points, calculating an expected next value for the time series data based on the plurality of sequential data points, and receiving an actual next value corresponding to the time series data. The operations also include calculating an anomaly strength estimate based on the expected next value and the actual next value, identifying one of a plurality of anomaly detection pipelines based on the anomaly strength estimate and a portrait associated with each of the plurality of anomaly detection pipelines, and obtaining an anomaly prediction by inputting the time series data and the actual next value into the one of the plurality of anomaly detection pipelines.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform operations. The operations include receiving a time series data including a plurality of sequential data points, calculating an expected next value for the time series data based on the plurality of sequential data points, and receiving an actual next value corresponding to the time series data. The operations also include calculating an anomaly strength estimate based on the expected next value and the actual next value, identifying one of a plurality of anomaly detection pipelines based on the anomaly strength estimate and a portrait associated with each of the plurality of anomaly detection pipelines, and obtaining an anomaly prediction by inputting the time series data and the actual next value into the one of the plurality of anomaly detection pipelines.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, machine learning models have been used to analyze time series data and to detect anomalous data. Currently, in the model-building phase, several different models are built on normal data and the models are evaluated on a data set that includes abnormal points. Typically, the model that successfully identifies the most abnormal points (anomalies) is selected and deployed to monitor the time series data. However, in practice, the abnormal points in the evaluation data often do not include a broad enough spectrum of anomalies. As a result, the best model in the evaluation phase may not behave the best for anomalies in the prediction phases.

Systems, methods, and computer program products for performing anomaly detection for time series data are provided. In exemplary embodiments, an anomaly detection system for detecting anomalies in time series data includes a plurality of pipelines that each include a different anomaly detection model. During the training model building and training, the performance of each of the different anomaly detection models is evaluated against multiple anomalies that have different types and different strengths. In exemplary embodiments, the performance of each anomaly detection model is represented as a portrait which is a function that correlates the performance of the anomaly detection model with an anomaly strength. In exemplary embodiments, as new time series data points are received an anomaly strength estimate is calculated for the new time series data points. The anomaly strength estimates are then compared with the portraits of the anomaly detection models of each pipeline and one of the pipelines is selected for performing the anomaly detection.

Embodiments of the present invention are directed to a computer-implemented method for performing anomaly detection for time series data. The computer-implemented method includes receiving a time series data including a plurality of sequential data points, calculating an expected next value for the time series data based on the plurality of sequential data points, and receiving an actual next value corresponding to the time series data. The method also includes calculating an anomaly strength estimate based on the expected next value and the actual next value, identifying one of a plurality of anomaly detection pipelines based on the anomaly strength estimate and a portrait associated with each of the plurality of anomaly detection pipelines, and obtaining an anomaly prediction by inputting the time series data and the actual next value into the one of the plurality of anomaly detection pipelines.

One technical benefit of this method for performing anomaly detection for time series data is that by selecting one plurality of anomaly detection pipelines based on the anomaly strength estimate, the accuracy of anomaly prediction generated is improved. In addition, the speed at which a computer can generate an accurate anomaly prediction is increased by selecting an appropriate anomaly detection pipeline rather than simultaneously or sequentially performing the anomaly detection using multiple pipelines.

Additionally, or alternatively, in embodiments of the present invention each of the plurality of anomaly detection pipelines includes an anomaly detection model and wherein the portrait associated with each anomaly detection pipeline is a function that correlates a performance of the anomaly detection model with an anomaly strength. One technical benefit of using the portrait associated with each anomaly detection pipeline to select the pipeline for anomaly detection is that the selection can be automated and performed based on an estimated anomaly strength, rather than requiring an individual to select the appropriate pipeline.

Additionally, or alternatively, in embodiments of the present invention the portrait associated with each anomaly detection pipeline is created by evaluating the performance of the anomaly detection model with a plurality of synthetic anomalies having a range of anomaly strengths and different anomaly types. One technical benefit of creating the portraits based on synthetic anomalies is that the type and magnitude of the anomalies can be controlled and the portrait will reflect the anomaly detection models behavior under a known range of anomalies.

Additionally, or alternatively, in embodiments of the present invention the expected next value is calculated as a weighted average of the plurality of sequential data points. One technical benefit of calculating the expected next value as a weighted average of the plurality of sequential data points is that more recent data points can be given a higher weight and a more accurate expected next value can be calculated.

Additionally, or alternatively, in embodiments of the present invention the anomaly strength estimate is calculated based on a deviation of the expected next value from a mean of the plurality of sequential data points and based on a standard deviation of the plurality of sequential data points.

Additionally, or alternatively, in embodiments of the present invention the one of a plurality of anomaly detection pipelines is identified by calculating a performance of an anomaly detection model associated with each of the plurality of anomaly detection pipelines for the corresponding anomaly strength estimate and identifying the one of the plurality of anomaly detection pipelines having the highest performance.

Additionally, or alternatively, in embodiments of the present invention the anomaly prediction includes a likelihood that an anomaly is present in the time series data and an indication of a type of the anomaly.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
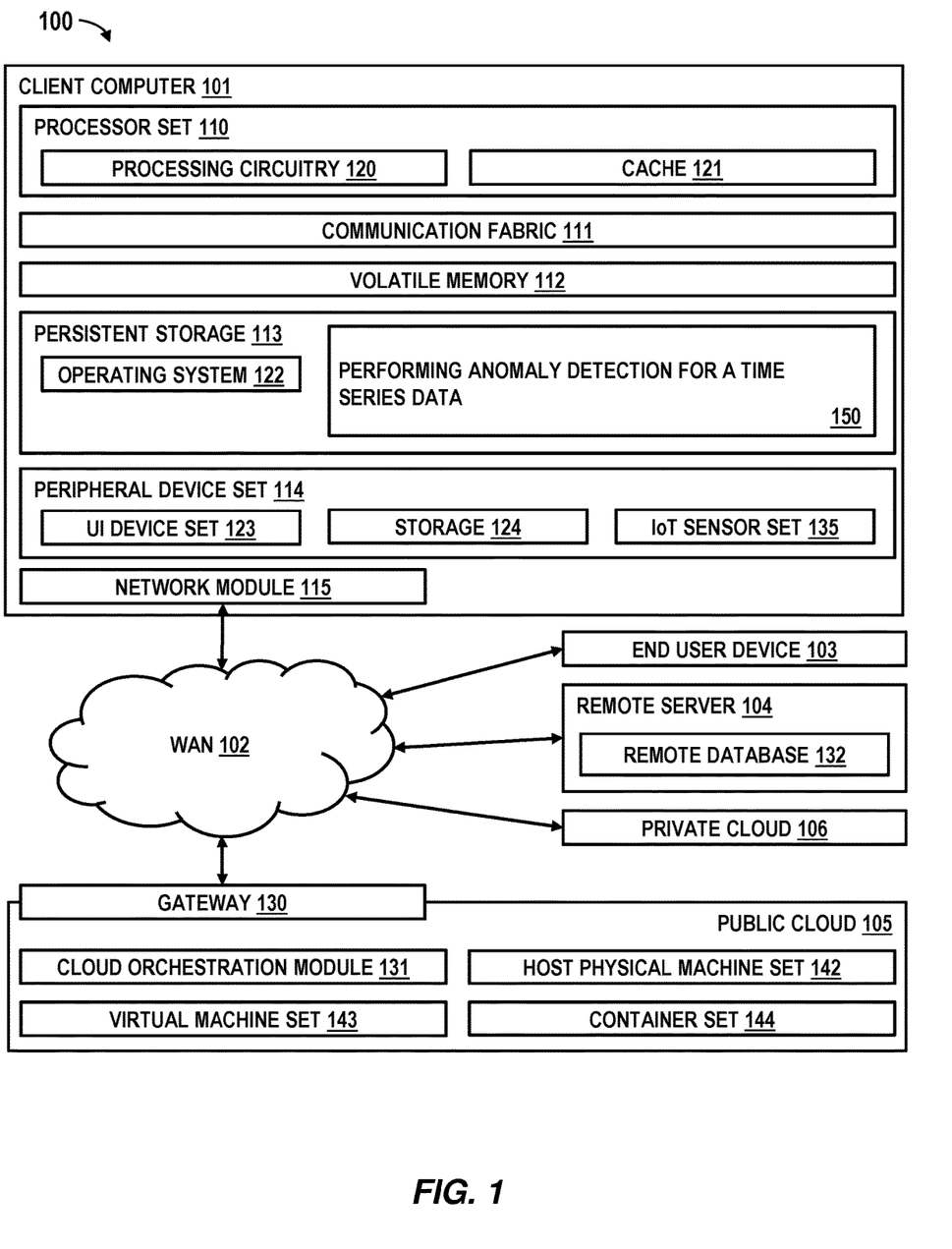
FIG. 1 is a schematic diagram of a computing environment in accordance with one or more embodiments of the present invention.

Computing environment 100 contains an example of an environment for the execution of at least some of the computer code involved in performing the inventive methods, such as performing anomaly detection for a time series data (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
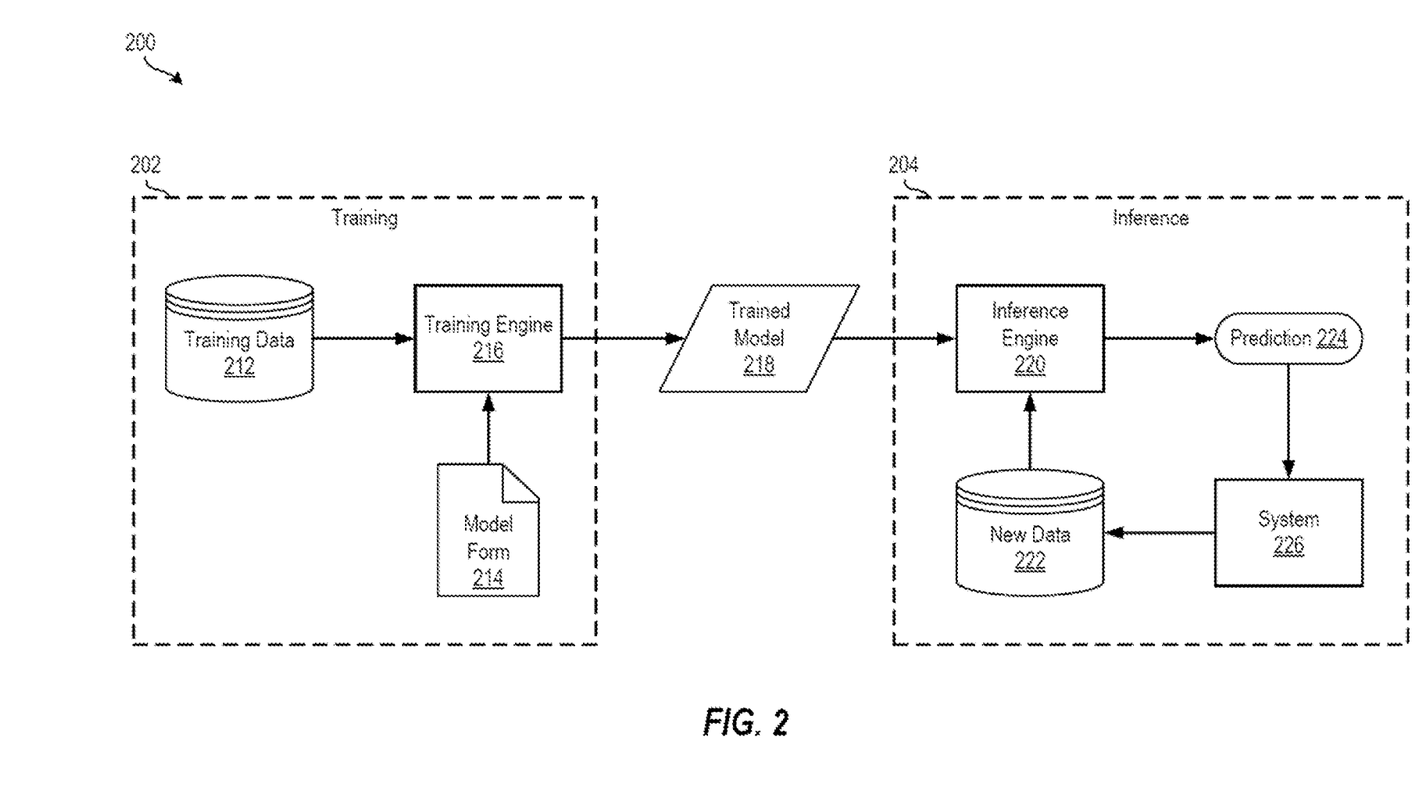
FIG. 2 is a block diagram of components of a machine learning training and inference system in accordance with one or more embodiments of the present invention.

Referring now to FIG. 2, a block diagram of components of a machine learning training and inference system 200 is shown. The machine learning training and inference system 200, in accordance with one or more embodiments of the invention, can utilize machine learning techniques to perform tasks, such as detecting anomalous data points in a time series data. Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information. In one or more embodiments of the present invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

GANs are an exciting recent innovation in machine learning and typically use an approach towards generative modelling using deep learning methods, such as CNNs. GANs are a clever way of training a generative model by framing the problem as a supervised learning problem with two sub-models: the generator model that we train to generate new examples and the discriminator model that tries to classify examples as either real (from the domain) or fake (generated). The two models are trained together in a zero-sum adversarial game until the discriminator model is fooled about half the time, meaning the generator model generates plausible examples.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to detect anomalous data points in time series data. To do this, the training data 212 includes a time series data set that includes one or more known anomalies. In this example, the training engine 216 takes as input a time series data from the training data 212, makes a prediction of an anomaly in the time series data, and compares the prediction to the known label, i.e., the known anomaly in the time series data. The training engine 216 then adjusts weights and/or biases of the model based on the results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task, such as detecting anomalous data points in a time series data. The inference engine 220 applies the trained model 218 to new data 222 (e.g., real-world, non-training data). For example, if the trained model 218 is trained to detect anomalous data points in a time series data, the new data 222 can be a time series data that was not part of the training data 212. In this way, the new data 222 represents data to which the model 218 has not been exposed. The inference engine 220 makes a prediction 224 (e.g., whether an anomaly is present in the new data 222) and passes the prediction 224 to the system 226. The system 226 can, based on the prediction 224, take an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the present invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Figure 3:
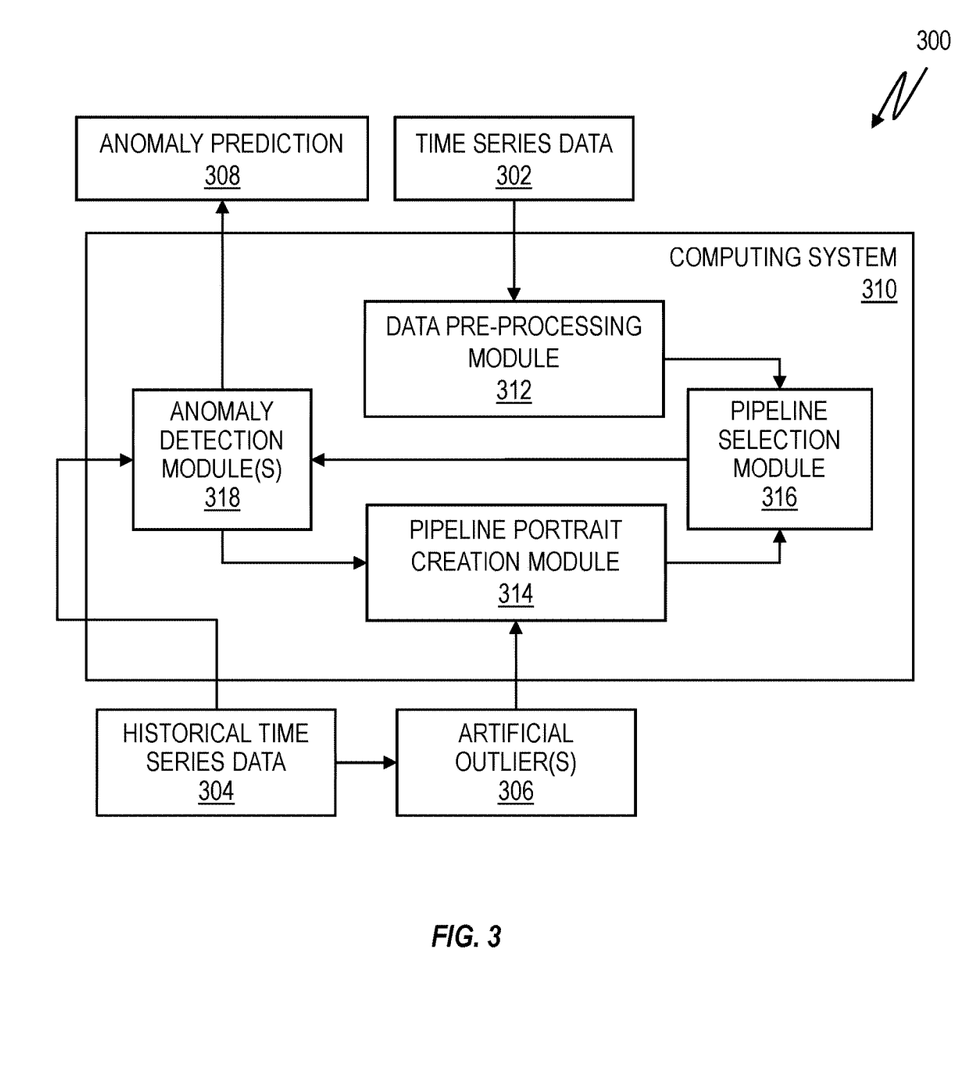
FIG. 3 is a schematic diagram illustrating a system performing anomaly detection for time series data in accordance with one or more embodiments of the present invention.

Referring now to FIG. 3, a block diagram illustrating a system 300 for performing anomaly detection for time series data in accordance with one or more embodiments of the present invention is shown. As illustrated, the system 300 includes a computing system 310. In exemplary embodiments, the computing system 310 is embodied in a computer 101 such as the one shown in FIG. 1. The computing system 310 includes a data pre-processing module 312, a pipeline portrait creation module 314, a pipeline selection module 316, and a plurality of anomaly detection modules 318.

In exemplary embodiments, the computing system 310 is configured to receive a historical time series data 304 and to create a plurality of anomaly detection models 318 using a machine learning training and inference system 200 shown in FIG. 2, based on a historical time series data 304. In one embodiment, the historical time series data 304 may be a univariate time series or multivariate time series. In exemplary embodiments, the plurality of anomaly detection models 318 can include various types of time series models, such as an autoregressive integrated moving average model, an exponential smoothing model, or other machine learning models such as random forest, support vector machine built on transformed data from time series data.

Once the plurality of anomaly detection models 318 have been created and trained, one or more artificial outliers 306 are injected into the historical time series data 304 and the data set is provided to the pipeline portrait creation module 314. In exemplary embodiments, the pipeline portrait creation module 314 obtains each of the anomaly detection models 318 and evaluates the performance of each of the anomaly detection models 318 based on the historical time series data 304, including the artificial outliers. In exemplary embodiments, the performance of an anomaly detection model 318 is calculated based on a number of false positives and false negatives identified by the anomaly detection model. In one embodiment, a portrait is created for each anomaly detection model 318, where the portrait is a function that correlates the performance of the anomaly detection model with an anomaly strength.

In exemplary embodiments, the data pre-processing module 312 of the computing system 310 is also configured to receive a time series data 302. The time series data 302 includes a plurality of sequential data points and may be a univariate time series or multivariate time series. In exemplary embodiments, the data pre-processing module 312 is configured to analyze the time series data 302 and to calculate an expected next value for the time series data 302 based on the plurality of sequential data points. In one embodiment, the expected next value for the time series data 302 is calculated as one of an average or a weighted average of a predetermined number of the most recent data points of the time series data.

In exemplary embodiments, the data pre-processing module 312 of the computing system 310 is also configured to compare an actual next value of the time series data 302 with the calculated expected next value for the time series data 302. Based on this comparison, the data pre-processing module 312 calculates an anomaly strength estimate corresponding to the actual next value of the time series data 302. In exemplary embodiments, the anomaly strength estimate is calculated based on a deviation of the expected next value from a mean of the plurality of sequential data points and based on a standard deviation of the plurality of sequential data points.

In exemplary embodiments, the pipeline selection module 316 obtains the anomaly strength estimate from the data pre-processing module 312 and the portraits of each of the anomaly detection models 318 from the pipeline portrait creation module 314. The pipeline selection module 316 is configured to compare the anomaly strength estimate to the portraits of each of the anomaly detection models 318 and to responsively select one of the pipelines to perform anomaly detection on the time series data 302. Once the pipeline has been selected, the time series data 302 is provided to the anomaly detection model 318 of the selected pipeline and the anomaly detection model 318 generates an anomaly prediction 308. In exemplary embodiments, the anomaly prediction 308 includes a likelihood that an anomaly is present in the time series data 302 and an indication of a type of anomaly.

Figure 4:
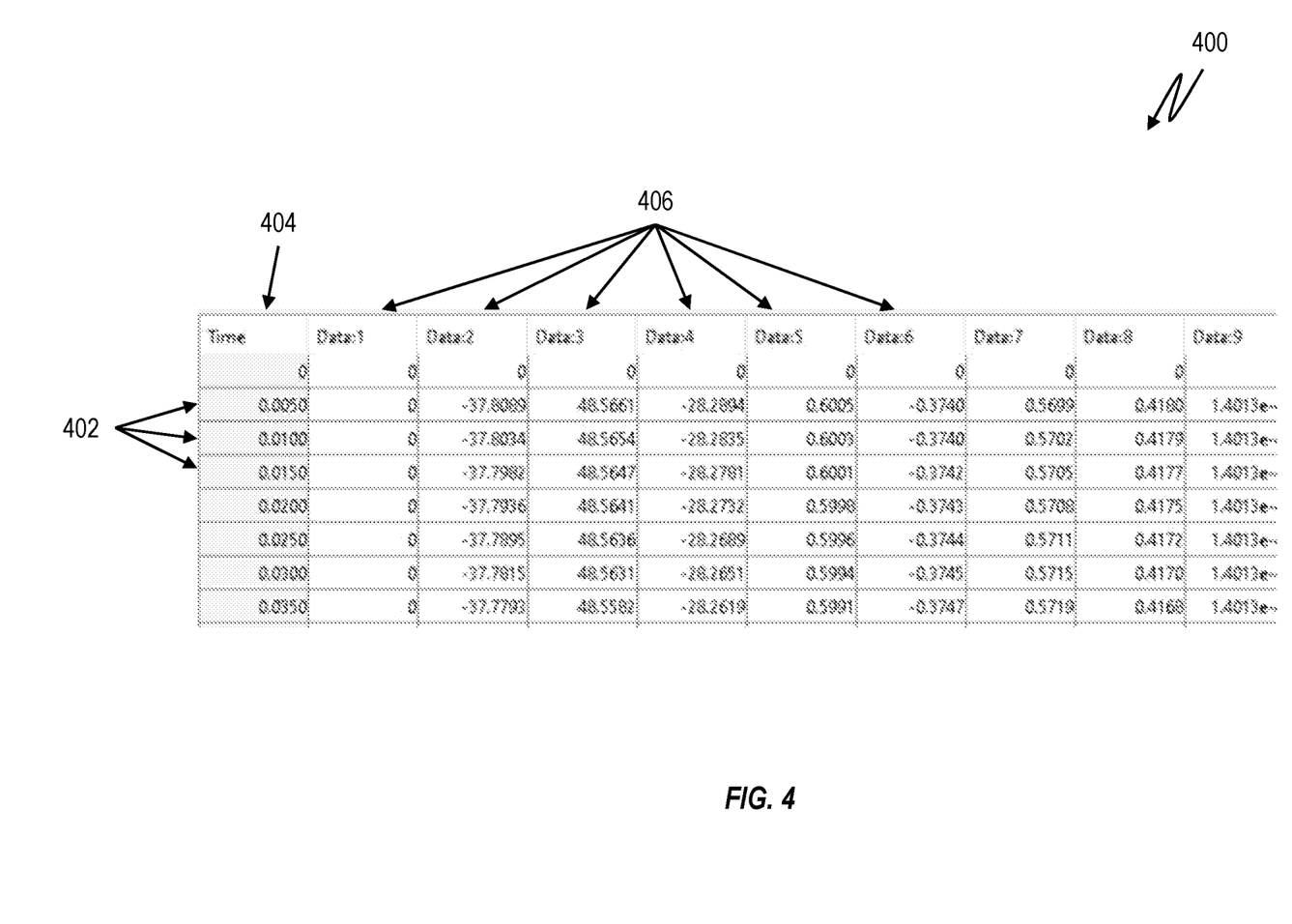
FIG. 4 is a schematic diagram illustrating a time series data in accordance with one or more embodiments of the present invention.

Referring now to FIG. 4, a schematic diagram illustrating a time series data 400 in accordance with one or more embodiments of the present invention is shown. As illustrated, the time series data 400 includes a plurality of sequential data points 402. In exemplary embodiments, each of the plurality of sequential data points 402 includes a timestamp 404 and one or more data elements 406.

Figure 5A:
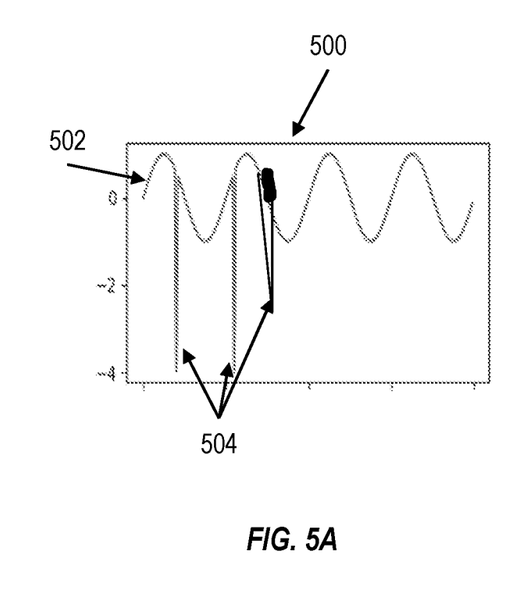
FIGS. 5A, 5B, and 5C are graphs illustrating various types of anomalies a time series data in accordance with one or more embodiments of the present invention.
Figure 5B:
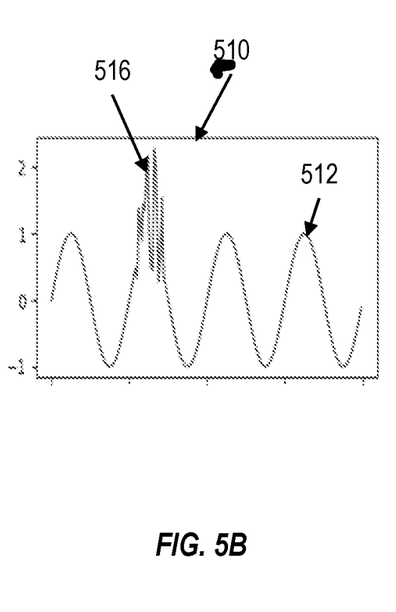
Figure 5C:
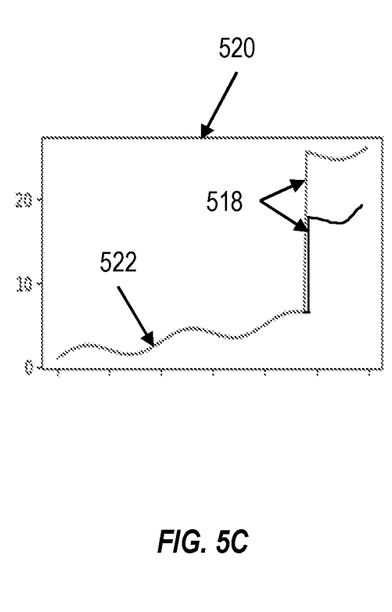

Referring now to FIGS. 5A, 5B, and 5C, graphs illustrating various types of anomalies a time series data in accordance with one or more embodiments of the present invention are shown. FIG. 5A illustrates a graph 500 which includes time series data 502 that has a sinusoidal nature and that includes one or more outlier anomalies 504. FIG. 5B illustrates a graph 510 which includes time series data 512 that has a sinusoidal nature and that includes one or more variance change anomalies 516. FIG. 5C illustrates a graph 520 which includes time series data 522 that has a sinusoidal nature and that includes one or more level shift anomalies 518. In exemplary embodiments, the artificial anomalies injected into the historical time series data that is used to evaluate the performance of the anomaly detection models may include outlier anomalies 504, variance change anomalies 516, and/or level shift anomalies 518 that have different strengths.

Figure 6:
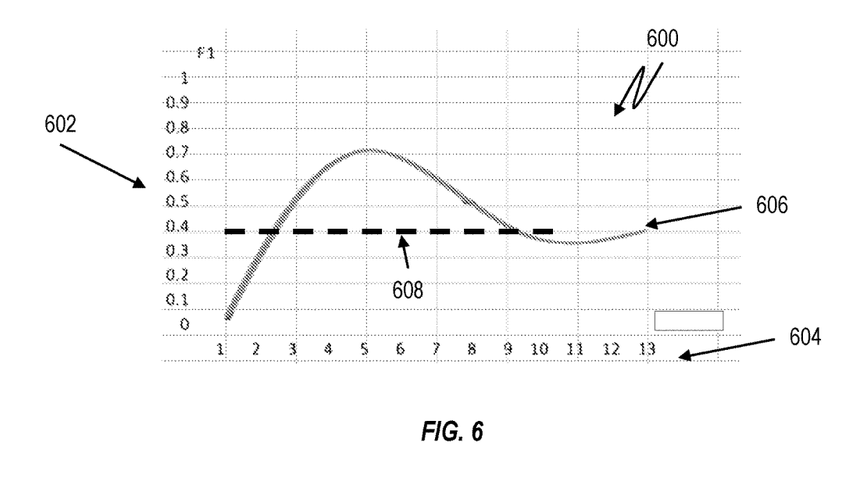
FIG. 6 is a graph illustrating a portrait of an anomaly detection pipeline in accordance with one or more embodiments of the present invention.

Referring now to FIG. 6, a graph 600 illustrating a portrait 606 of an anomaly detection pipeline in accordance with one or more embodiments of the present invention is shown. As illustrated, the portrait 606 is a function of the performance 602 of an anomaly detection model of an anomaly detection pipeline relative to the anomaly strength 604. In the illustrated embodiment, the performance 602 is shown as an F1 score, which is calculated as a harmonic mean of the accuracy and recall of the anomaly detection model. The accuracy of the anomaly detection model is the percentage of data points that are flagged as abnormal that are actually abnormal, i.e., the accuracy of the anomaly detection model is one hundred minus the rate of false positives identified by the anomaly detection model. The recall of the anomaly detection model is the percentage of the abnormal points that were correctly identified by the anomaly detection model, i.e., the recall of the anomaly detection model is one hundred minus the rate of false negatives identified by the anomaly detection model.

The strength 604 of the anomaly is calculated as a Z-score for the data point representing the anomaly. For example, the anomaly strength estimate for a data point can be calculated as an absolute value of a Z-score, which is the absolute value of a difference between the data point and the mean of a predetermined number of previous data points multiplied by the standard deviation of the predetermined number of previous data points.

As shown, the graph 600 also includes a minimum threshold 608 that indicates a minimum level of performance 602 at which the anomaly detection model is determined to be effective. In the illustrated embodiment, the minimum threshold 608 is approximately 0.4. Accordingly, the anomaly detection model corresponding to the graph 600 is determined to be effective in identifying anomalies that have a strength 604 of between 2.5 and 9.5.

Figure 7:
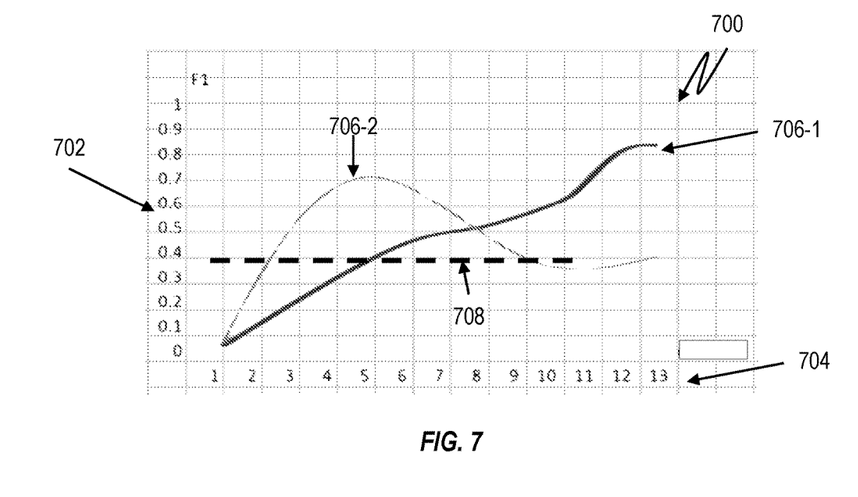
FIG. 7 is a graph illustrating portraits of multiple anomaly detection pipelines in accordance with one or more embodiments of the present invention.

Referring now to FIG. 7, a graph 700 illustrating portraits 706-1 and 706-2 of anomaly detection models associated with different anomaly detection pipelines in accordance with one or more embodiments of the present invention is shown. Similar to FIG. 6, the portraits 706-1 and 706-2 are a function of the performance 702 of anomaly detection models of different anomaly detection pipelines relative to the anomaly strength 704. In one embodiment, the performance 702 is shown as an F1 score, which can be calculated as a harmonic mean of the accuracy and recall of the anomaly detection model. The strength 704 of the anomaly is calculated a Z-score for the data point representing the anomaly.

As shown, the graph 700 also includes a threshold minimum 708 that indicates a minimum level of performance 702 at which the anomaly detection model is determined to be effective. In the illustrated embodiment, the threshold minimum 708 is approximately 0.4. In exemplary embodiments, based on the graph 700 when a new data point is received that has an anomaly strength estimate between 2 and 7.5, time series data will be sent to the pipeline corresponding to portrait 706-2 for anomaly detection. Likewise, when a new data point is received that has an anomaly strength estimate greater than 7.5, time series data will be sent to the pipeline corresponding to portrait 706-1 for anomaly detection.

In one embodiment, where neither of the portraits 706-1 or 706-2 have an indicated performance above the threshold minimum 708, the highest-performing pipeline may be selected for performing anomaly detection. For example, when a new data point is received that has an anomaly strength estimate of less than 2, time series data will be sent to the pipeline corresponding to portrait 706-2 for anomaly detection. In another embodiment, where neither of the portraits 706-1 or 706-2 has an indicated performance above the threshold minimum 708, both pipelines may be selected for performing anomaly detection. For example, when a new data point is received that has an anomaly strength estimate of less than 2, time series data will be sent to both pipelines corresponding to portraits 706-1 and 706-2 for anomaly detection.

Figure 8:
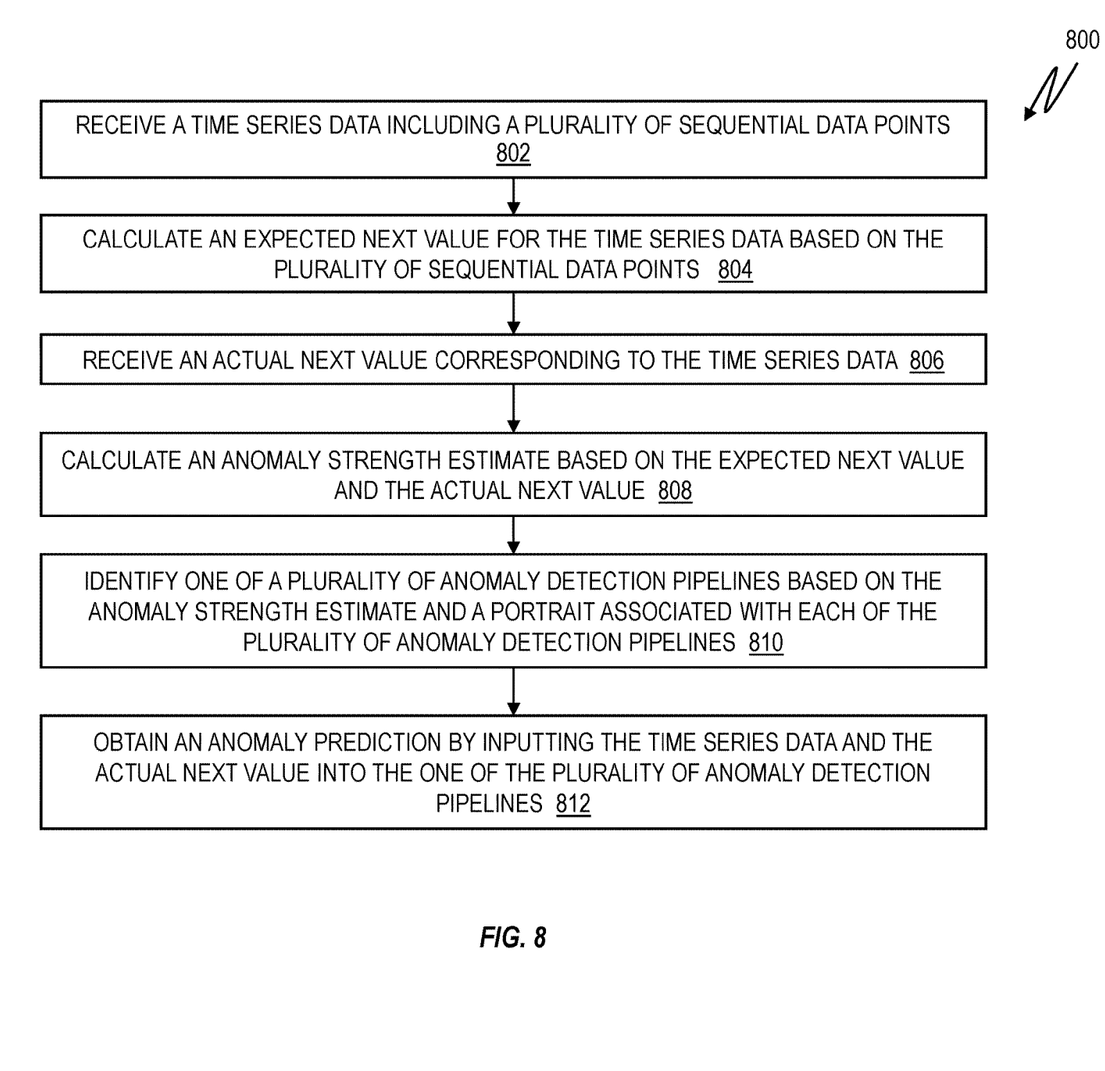
FIG. 8 is a flow diagram illustrating a computer-implemented method for performing anomaly detection for time series data in accordance with one or more embodiments of the present invention.

Referring now to FIG. 8, a flow diagram illustrating a computer-implemented method 800 for performing anomaly detection for time series data in accordance with one or more embodiments of the present invention is shown. In exemplary embodiments, the method 800 is performed by a computing system 310, such as the one shown in FIG. 3.

At block 802, the method 800 includes receiving the time series data including a plurality of sequential data points. Next, as shown at block 804, the method 800 includes calculating an expected next value for the time series data based on the plurality of sequential data points. In one embodiment, the expected next value for the time series data is an average value of a predetermined number of the most recent sequential data points. In another embodiment, the expected next value for the time series data is a weighted average value of a predetermined number of the most recent sequential data points, where more recent data points are assigned higher weights that are less than recent data points.

At block 806, the method 800 includes receiving an actual next value corresponding to the time series data. Next, as shown at block 808, the method 800 includes calculating an anomaly strength estimate based on the expected next value and the actual next value. In one embodiment, the anomaly strength estimate is calculated based on a deviation of the expected next value from a mean of the plurality of sequential data points and based on a standard deviation of the plurality of sequential data points. For example, the anomaly strength estimate for a data point can be calculated as an absolute value of a Z-score, which is the absolute value of a difference between the data point and the mean multiplied by the standard deviation.

At block 810, the method 800 includes identifying one of a plurality of anomaly detection pipelines based on the anomaly strength estimate and a portrait associated with each of the plurality of anomaly detection pipelines. In exemplary embodiments, each of the plurality of anomaly detection pipelines includes an anomaly detection model and the portrait associated with each anomaly detection pipeline is a function that correlates the performance of the anomaly detection model with an anomaly strength.

In one example, the portrait provides an expected performance based on an input anomaly strength. In one embodiment, the performance is calculated based on the accuracy and recall of the anomaly detection model for anomalies with a specified strength. The accuracy of the anomaly detection model is the percentage of data points that are flagged as abnormal that are actually abnormal. Otherwise stated, the accuracy of the anomaly detection model is one hundred minus the rate of false positives identified by the anomaly detection model. The recall of the anomaly detection model is the percentage of the abnormal points that were correctly identified by the anomaly detection model. Otherwise stated, the recall of the anomaly detection model is one hundred minus the rate of false negatives identified by the anomaly detection model. In one embodiment, the portrait of a model is a function of an F1 value of the model to the anomaly strength, where the F1 value is calculated as a harmonic mean of the accuracy and recall of the anomaly detection model.

In exemplary embodiments, the portrait associated with each anomaly detection pipeline is created by evaluating the performance of the anomaly detection model with a plurality of synthetic anomalies having a range of anomaly strengths and different anomaly types. For example, outlier anomalies, variance change anomalies, level shift anomalies of various strengths are injected into historical data sets and provided to each of a plurality of models. The performance of the plurality of models to each of the various types and strengths of anomalies are then used to create the portrait of each anomaly detection model/pipeline. In an exemplary embodiment, the strength of the injected anomalies is measured using an absolute value of a Z-score of the injected data point.

In exemplary embodiments, the one of the plurality of anomaly detection pipelines is identified by calculating a performance of an anomaly detection model associated with each of the plurality of anomaly detection pipelines for the corresponding anomaly strength estimate and identifying the one of the plurality of anomaly detection pipelines having the highest performance.

At block 812, the method 800 includes obtaining an anomaly prediction by inputting the time series data and the actual next value into the one of the plurality of anomaly detection pipelines. In one embodiment, the anomaly prediction includes a likelihood that an anomaly is present in the time series data and an indication of a type of the anomaly.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for anomaly detection for a time series data, the computer-implemented method comprising:
   receiving the time series data including a plurality of sequential data points;
   calculating an expected next value for the time series data based on the plurality of sequential data points;

receiving an actual next value corresponding to the time series data;
calculating an anomaly strength estimate based on the expected next value and the actual next value;
identifying one of a plurality of anomaly detection pipelines based on the anomaly strength estimate and a portrait associated with each of the plurality of anomaly detection pipelines, wherein each of the plurality of anomaly detection pipelines includes an anomaly detection model and wherein the portrait associated with each anomaly detection pipeline is a function that correlates a performance of the anomaly detection model with an anomaly strength,
wherein the one of a plurality of anomaly detection pipelines is identified by:
calculating a performance of the anomaly detection model associated with each of the plurality of anomaly detection pipelines for the anomaly strength estimate based on the portrait associated with each anomaly detection pipeline; and
identifying the one of the plurality of anomaly detection pipelines having the highest performance; and
obtaining an anomaly prediction by inputting the time series data and the actual next value into the one of the plurality of anomaly detection pipelines,
wherein the portrait associated with each anomaly detection pipeline is created by evaluating the performance of the anomaly detection model with a plurality of synthetic anomalies having a range of anomaly strengths and different anomaly types.

2. The computer-implemented method of claim 1, wherein the expected next value is calculated as a weighted average of the plurality of sequential data points.

3. The computer-implemented method of claim 1, wherein the anomaly strength estimate is calculated based on a deviation of the expected next value from a mean of the plurality of sequential data points and based on a standard deviation of the plurality of sequential data points.

4. The computer-implemented method of claim 1, wherein the anomaly prediction includes a likelihood that an anomaly is present in the time series data and an indication of a type of the anomaly.

5. The computer-implemented method of claim 1, wherein the performance of an anomaly detection model is calculated based on a number of false positives and false negatives identified by the anomaly detection model.

6. The computer-implemented method of claim 1, wherein the performance of the anomaly detection model is an F1 score that is calculated as a harmonic mean of an accuracy and recall of the anomaly detection model, where the recall of the anomaly detection model is a percentage of the abnormal points that were correctly identified by the anomaly detection model and the accuracy of the anomaly detection model is a percentage of data points that are flagged as abnormal that are actually abnormal.

7. A computer program product having one or more computer readable storage media having computer readable program code collectively stored on the one or more computer readable storage media, the computer readable program code being executed by a processor of a computer system to cause the computer system to perform operations comprising:
receiving a time series data including a plurality of sequential data points;
calculating an expected next value for the time series data based on the plurality of sequential data points;
receiving an actual next value corresponding to the time series data;
calculating an anomaly strength estimate based on the expected next value and the actual next value;
identifying one of a plurality of anomaly detection pipelines based on the anomaly strength estimate and a portrait associated with each of the plurality of anomaly detection pipelines, wherein each of the plurality of anomaly detection pipelines includes an anomaly detection model and wherein the portrait associated with each anomaly detection pipeline is a function that correlates a performance of the anomaly detection model with an anomaly strength,
wherein the one of a plurality of anomaly detection pipelines is identified by:
calculating a performance of the anomaly detection model associated with each of the plurality of anomaly detection pipelines for the anomaly strength estimate based on the portrait associated with each anomaly detection pipeline; and
identifying the one of the plurality of anomaly detection pipelines having the highest performance; and
obtaining an anomaly prediction by inputting the time series data and the actual next value into the one of the plurality of anomaly detection pipelines,
wherein the portrait associated with each anomaly detection pipeline is created by evaluating the performance of the anomaly detection model with a plurality of synthetic anomalies having a range of anomaly strengths and different anomaly types.

8. The computer program product of claim 7, wherein the expected next value is calculated as a weighted average of the plurality of sequential data points.

9. The computer program product of claim 7, wherein the anomaly strength estimate is calculated based on a deviation of the expected next value from a mean of the plurality of sequential data points and based on a standard deviation of the plurality of sequential data points.

10. The computer program product of claim 7, wherein the anomaly prediction includes a likelihood that an anomaly is present in the time series data and an indication of a type of the anomaly.

11. A computing system comprising:
a processor;
a memory coupled to the processor; and
one or more computer readable storage media coupled to the processor, the one or more computer readable storage media collectively containing instructions that are executed by the processor via the memory to cause the processor to perform operations comprising:
receiving a time series data including a plurality of sequential data points;
calculating an expected next value for the time series data based on the plurality of sequential data points;
receiving an actual next value corresponding to the time series data;
calculating an anomaly strength estimate based on the expected next value and the actual next value;
identifying one of a plurality of anomaly detection pipelines based on the anomaly strength estimate and a portrait associated with each of the plurality of anomaly detection pipelines, wherein each of the plurality of anomaly detection pipelines includes an anomaly detection model and wherein the portrait associated with each anomaly detection pipeline is a function that correlates a performance of the anomaly detection model with an anomaly strength, wherein the one of a plurality of anomaly detection pipelines is identified by:
  calculating a performance of the anomaly detection model associated with each of the plurality of anomaly detection pipelines for the anomaly strength estimate based on the portrait associated with each anomaly detection pipeline; and
  identifying the one of the plurality of anomaly detection pipelines having the highest performance; and
  obtaining an anomaly prediction by inputting the time series data and the actual next value into the one of the plurality of anomaly detection pipelines,
wherein the portrait associated with each anomaly detection pipeline is created by evaluating the performance of the anomaly detection model with a plurality of synthetic anomalies having a range of anomaly strengths and different anomaly types.

12. The computing system of claim 11, wherein the expected next value is calculated as a weighted average of the plurality of sequential data points.

13. The computing system of claim 11, wherein the anomaly strength estimate is calculated based on a deviation of the expected next value from a mean of the plurality of sequential data points and based on a standard deviation of the plurality of sequential data points.

* * * * *